United States Patent Office 3,310,530
Patented Mar. 21, 1967

3,310,530
SEQUESTERING ION EXCHANGE RESINS
Le Roy A. White, Root Road, Somers, Conn. 06071
No Drawing. Filed Apr. 3, 1964, Ser. No. 357,287
6 Claims. (Cl. 260—47)

This is a continuation-in-part of application Ser. No. 765,924 filed Oct. 8, 1958 and now abandoned.

The present invention relates to ion exchange resins and, more particularly, ion exchange resins which comprise a chelating molecule attached to a resin or polymer through the reaction of an NH group on one component with an epoxy group on the other component.

Ion exchange resins are known and are commercially available for a variety of uses. Many commercial operations require water or water solutions which are substantially free of trivalent cations, such as ferric ions; monovalent cations, such as sodium, however, are often not objectionable in such operations. The prior art methods of removing multivalent cations from aqueous solutions embody the following materials:

(1) Sulfated or carboxylated insoluble resins;
(2) Inorganic siliceous materials;
(3) Sequestering agents.

These materials suffer from the following defects:

(1) Sulfated and carboxylated insoluble resins, such as sulfated styrene/divinyl benzene copolymers, sulfated coal and crosslinked polyacrylic acid, indiscriminately remove all cations from solution rather than selectively removing only the multivalent cations. Unnecessary removal of monovalent ions causes the unnecessary expense of regenerating the ion exchange resin more frequently than would be required if only the multivalent ions were removed.

(2) Inorganic sliceous materials, such as zeolites, do not in general suffer from the aforementioned defect. However, their efficiency in preferentialy removing multivalent ions is not sufficiently high to justify their use in many processes where they have other disadvantages, e.g., silicates are not used in metals purification procedures since any attempt to leach out absorbed metals will usually destroy the silicate. In addition, the inorganic siliceous materials are readily soluble in water unless the pH is carefuly controlled and thus cause procedural difficulties.

(3) Sequestering agents, such as ethylene diamine tetra-acetic acid, are useful in many operations where it is necessary to remove multivalent cations. However, such sequestering agents are preferably not used in the manufacture of beverages, such as wine or beer, to prevent the formation of precipitates caused by multivalent cations, since the sequestering agents effectively remove calcium from teeth. Also, where the multivalent cations can enter into chemical reactions, the sequestering agents are of limited effectiveness because they will continuously release the cation to maintain the reaction equilibrium as the cations in solution are consumed.

It is, therefore, an object of this invention to provide ion exchange resins which will remove multivalent cations from solutions in preference to monovalent ions.

It is another object to produce ion exchange resins which comprise a chelating molecule attached to a nitrogen-containing polymer by connection to the nitrogen in the polymer chain.

It is another object of the present invention to provide a simple, convenient and effective method of synthesis of a sequestering ion exchange resin.

It is another object to produce insoluble resins having far greater affinity for multivalent ions than for monovalent ions which do not suffer from the defects of the prior art, such as those mentioned above.

It is another object of the present invention to produce ion exchange resins which comprise a nitrogen-containing chelating molecule attached to an epoxy resin by connection of the nitrogen to the epoxy.

It is another object of the present invention to provide ion exchange resins containing the grouping

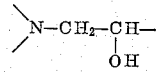

These and other objects and the nature and advantages of the present invention will be apparent from the following description.

The objects of this invention are attained by attaching a sequestering grouping to a resin or polymer by the reaction of an NH group on one component with an epoxy group on the other component. This may be accomplished in a number of ways, such as:

(1) By reacting an NH containing sequestering agent with an epoxy group of an epoxy resin, containing at least two epoxy groups;

(2) By carrying out procedure (1) and then cross-linking the unreacted epoxy group with another material;

(3) By partially crosslinking in epoxy resin and then reacting the unreacted epoxy groups with an NH containing sequestering agent;

(4) By reacting an epoxy containing sequestering agent with an NH containing resin or polymer;

(5) By carrying out reaction (4) and then crosslinking the resin or polymer;

(6) By reacting an epoxy containing sequestering agent with an NH containing monomer and then effecting polymerization of the sequestering-containing monomer, particularly with another monomer; and (7) By carrying out procedure (6) and then cross-linking the polymer.

The sequestering agents utilized in the present invention comprise amino and mixed amino-ether acids having generally 2 or 3 amino or amino-ether coordinating groups, three or more acid groups (i.e., carboxyl, phosphonic, and/or sulfonic), and a multiplicity of methylene groups between the acid and coordinating groups so arranged that three or more cyclical structures may be formed with the absorbed trivalent metal during use of the resin. Each of these cyclical structures should contain from 5 to 7 units including the metal, the coordinating group and the acid group. As an example a cyclical group in ethylene diamine tetraacetic acid is shown:

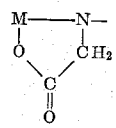

where M is the trivalent metal.

In the case where the sequestering agent is attached to a polymer, it is necessary that the sequestering grouping be attached to the polymer chain as a side-group and not in itself a link connecting two segments of the chain, since if the sequestering grouping becomes a link in the chain, its ability to chelate a metallic ion is seriously hampered. Thus,

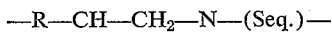

is undesirable while

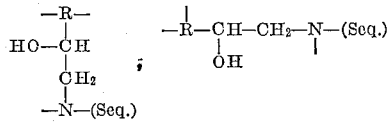

or

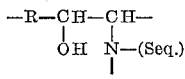

are desirable, where Seq. is a sequestering grouping and R signifies a repeating organic group.

Where the epoxy group is in the material to be reacted with the sequestering agents, the sequestering agents will generally fall within the formula:

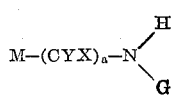

wherein, —G is selected from the group consisting of —H, $-(CH_2)_pCOOH$, $-CH(COOH)_2$, $-CH_2CH_2OH$, $-CH_2CH_2-O-CH_2CH_2OH$

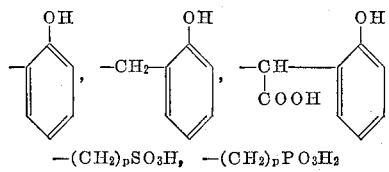

$-(CH_2)_pSO_3H$, $-(CH_2)_pPO_3H_2$ and not to exceed one unit per sequestering agent molecule of

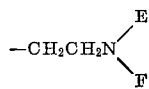

wherein $p$ is an integer of from 0-2 inclusive; wherein —X is selected from the group consisting of —H and $-(CH_2)_6COOH$; wherein —Y is selected from the group consisting of —H, —COOH, and —OH; wherein $a$ is an integer of from 1 to 3 inclusive; wherein —M is selected from the group consisting of

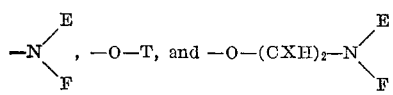

wherein —T is selected from the group consisting of

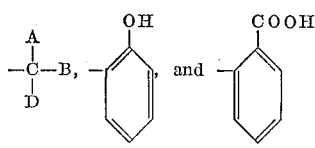

wherein —A, —B, and —D are selected from the group consisting of

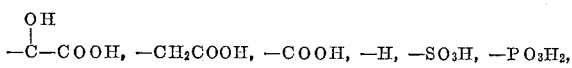

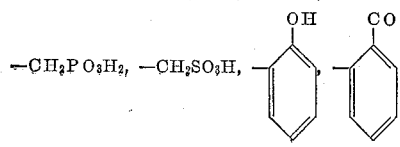

and not to exceed one unit per sequestering agent molecule of $-(CHY)_a-O-T$; and wherein —E and —F are the same as —G.

An exception to the general formula, which has also been found to be useful in the present invention is the sequestering agent amino diacetic acid.

Specific sequestering agents falling within the above formula are: ethylene diamine triacetic acid; ethylene diamine diacetic acid; N-mono-ethoxy ethylene diamine diacetic acid; ethylene diamine di-(O-hydroxy-phenyl acetic acid); ethylene diamine diacetic acid methylene phosphonic acid; ethylene diamine acetic acid dimethylene phosphonic acid; diethylene-triamine tetracetic acid; ethylene diamine acetic acid diethylene sulfonic acid; ethylene diamine diacetic acid ethylene sulfonic acid;

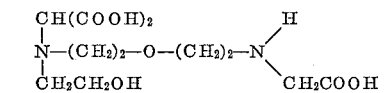

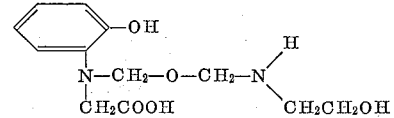

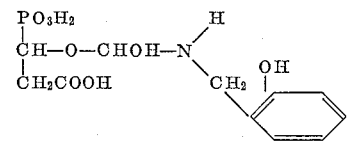

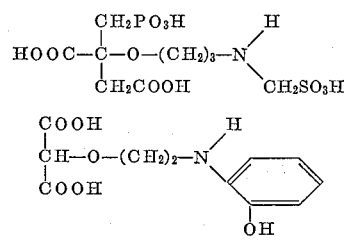

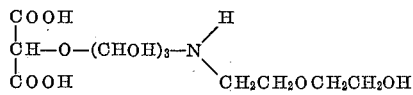

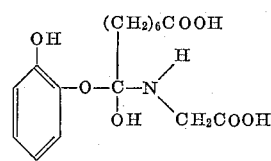

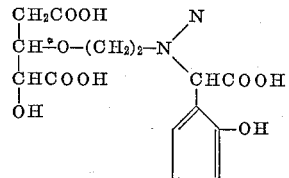

and

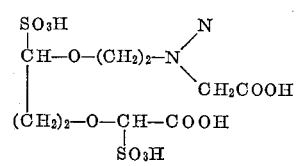

These and the many other sequestering agents falling within the general formula are reacted with organic compounds containing a plurality of epoxy groupings.

Materials which can be used as the organic compounds containing a plurality of epoxy groupings in the present invention include the following: epoxy resins such as bisphenol A (4,4'-isopropylidenediphenol) epoxies formed by the reaction of bisphenol A and epichlorohydrin; epoxidized butadiene polymers; epoxidized butadiene-styrene copolymers; epoxidized vinyl cyclohexene; epoxidized divinyl benzene; epoxidized phenolformaldehyde such as Novolac based epoxies formed by the reaction of epichlorohydrin and low molecular weight phenolformaldehyde polymers; epoxidized resorcinol-formaldehyde; 1-vinyl phenoxy-2,3-epoxy propane polymers; glycidyl methacrylate polymers; polyepoxides of polyunsaturated materials; epoxidized natural oils; limonene dioxide; 3,4-epoxy-6-methyl-cyclohexyl methyl 3,4-epoxy-6-methyl cyclohexane carboxylate; dicyclopentadiene dioxide; and copolymers of the above materials. Among these materials, the ones preferred are those having the group

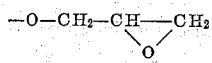

since ether activated epoxies preferentially react with the group

The reaction products of the above groups of compounds will in each case provide a "resin" which is either insoluble or which can be simply and easily insolubilized and which contains, not only the sequestering portions contributed by the nitrogen containing sequestering agent, but also at least one group

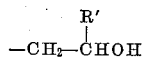

wherein R' is an organic grouping which may or may not be repeating. This configuration aids in sequestering, particularly in alkaline medias, in a manner similar to the known compound

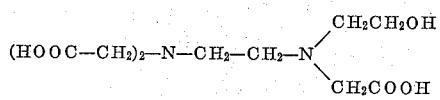

In addition to the reaction between the organic compound containing a plurality of epoxy groupings and the nitrogen containing sequestering agent, such compounds may also be reacted with crosslinking agents, preferably after the reaction between the sequestering agent and the epoxy resin. However, even though it is preferred to crosslink the resin after attaching the sequestering groups, the crosslinked resin structure may be found first and then reacted with the sequestering agent.

Crosslinking agents, if used, include compounds which will react with polyepoxides, preferably such as amines or imines. Polybasic acids, polyisocyanates, and aldehydes may also be used.

Amino crosslinking agents operate in the following manner:

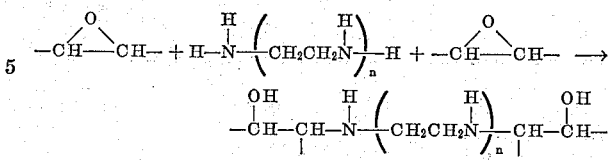

Such amino crosslinking agents include polyethylenimine and tetraethylene pentamine as well as the other members falling within the family

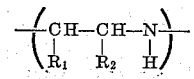

wherein $R_1$ and $R_2$ are selected from the group consisting of —H, —$(CH_2)_{0-5}CH_3$, —$C(CH_3)_3$, —$CH(CH_3)_2$, —$CH_2CH(CH_3)_2$,

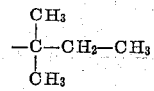

and

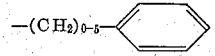

Aldehydes effect crosslinkage in the following manner:

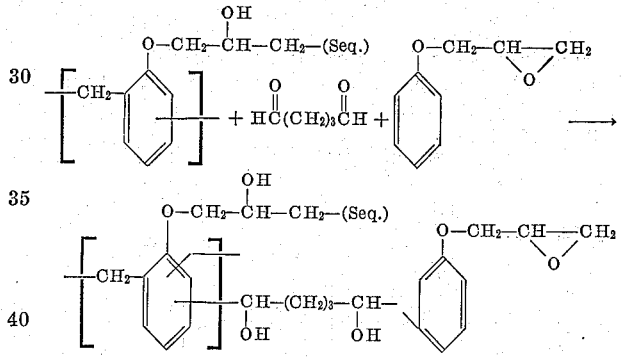

Such aldehyde crosslinking agents include formaldehyde, glyoxal, and glutaraldehyde.

Isocyanates effect crosslinkage in the following manner:

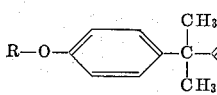

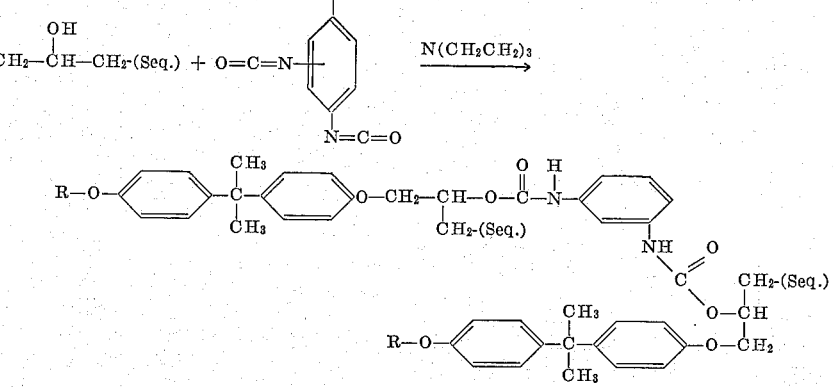

Such isocyanate crosslinking agents include toluene diisocyanate,

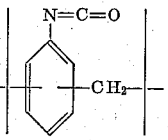

and

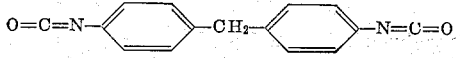

To obtain the ion exchange chelating resins of the present invention, it is also possible to react the nitrogen containing sequestering agents with monomeric epoxides, particularly those capable of reacting with aldehydes, and then copolymerizing the resultant monomeric sequestering agent and the aldehyde. An excess of aldehyde under acidic conditions will yield an insoluble crosslinked chelating resin.

Another method of obtaining the ion exchange chelating resins containing the group

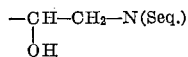

comprises reacting the >NH containing sequestering agent such as diethylene triamine tetracetic acid with materials such as epichlorohydrin or other epoxy monomers to yield sequestering agents of the formula

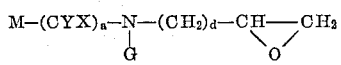

wherein M, Y, X, $a$, and G are defined above and $d$ is an integer of from 1 to 4 (epoxidized amino diacetic acid may also be used) and then reacting the epoxidized sequestering agent with either (1) a polyamine or polyimine, or (2) an amine or imine monomer which is then polymerized either during or after the reaction with the epoxidized sequestering agent. The reaction of the epoxidized sequestering agent with a polyamine or polyimine is preferred.

Polyamines or amine resins suitable for use with epoxidized sequestering agents include:

(1) The reaction products of aryl amines with aldehydes, e.g.:

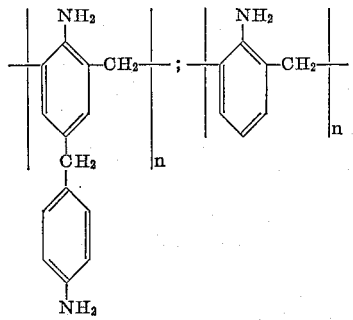

(2) The reaction product of tetraethylene pentamine and aldehydes;

(3) Compounds of the general formula:

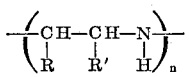

wherein $R_1$ and $R_2$ are selected from the group consisting of —H, —(CH$_2$)$_{0-5}$CH$_3$, —C(CH$_3$)$_3$, —CH(CH$_3$)$_2$, —CH$_2$CH(CH$_3$)$_2$,

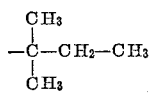

and

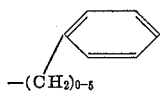

e.g. polyethylenimine; and (4) Polymers containing a multiplicity of polyvinyl benzylamine units, e.g.

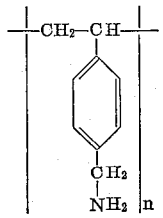

The invention is illustrated by the following examples which are intended merely for illustration and are not to be interpreted as limiting the invention.

*Example 1*

A poly (glycidyl methacrylate) containing 30% epoxy groupings is reacted with ethylene diamine triacetic acid according to the following reaction:

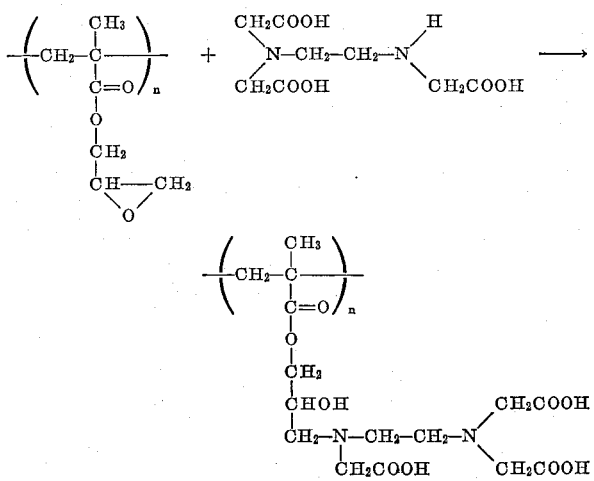

*Example 2*

An ion exchange resin was produced by the reaction of diethylene triamine tetracetic acid and a bisphenol epoxy. Into a reactor was charged 0.1 mol of the sodium salt of diethylene triamine tetracetic acid, 35.8 gms. of Dow 332 Bisphenol Epoxy, and 500 cc. of acetone. The mixture was heated at 50° C. for 9 hours. The acetone was then evaporated and 200 cc. of tetrahydrofuran were added. The mixture was warmed and 40 cc. of distilled water were then added. Two layers resulted: a cloudy lower layer and a clear upper layer. The upper layer was removed (unreacted epoxy) and the lower cloudy layer became a clear solution after the addition of 15 cc. distilled water. Polyethyleneimine, 50% solution, was then added to the clear solution (8.6 gms. 0.1 mol). The solvents were then evaporated on the steam bath.

The resin was ground to a powder with a Waring Blendor in water. The resin was placed in an ion exchange column and flushed with sodium hydroxide and distilled water. 10 cc. of the opaque white resin was titrated with ferric chloride solution. The 10 cc. took up 1.26 meq. of iron and were found to contain 1.25 gms. dry resin (which is equivalent to 1 meq. of iron per gram of dry resin). The resin is shown to be an effective ion exchange chelating resin.

The reactions proceed as follows:

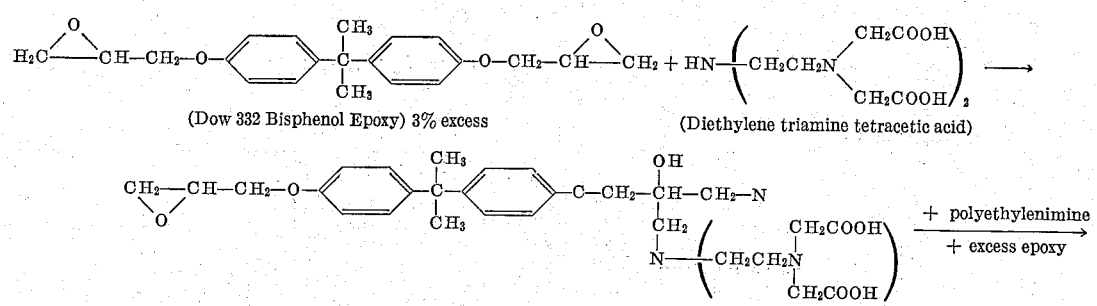

a plurality of the following repeating units:

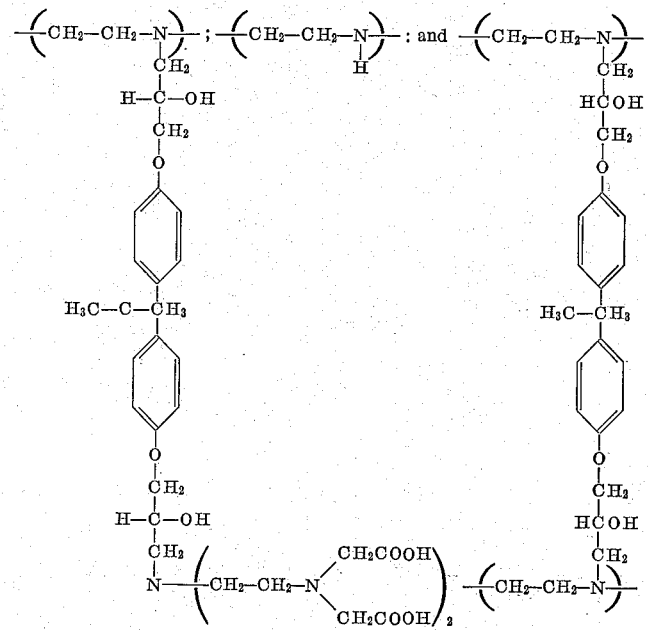

Example 3

The procedure of Example 2 is followed utilizing 18 grams of a novalac based epoxy, i.e., Dow D.E.N. 438 (180 g./epoxy) having the average formula:

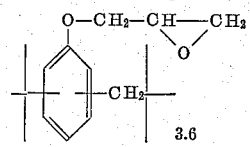

together with 25.4 grams of the sequestering agent

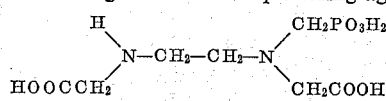

at a pH of 10.5. The resultant resin has the formula:

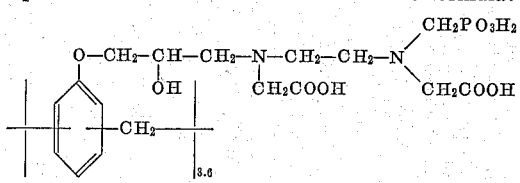

This, in turn, is crosslinked with 4 grams of glutaraldehyde at 90° C. and a pH of 10.5. The reaction mixture is then acidified causing precipitation of the polymer gel which is then dried and cured to yield the insoluble ion exchange chelating resin.

Example 4

The procedure of Example 2 is followed utilizing 11.4 grams of polyallyl glycidyl ether (114 g./epoxy) of the formula

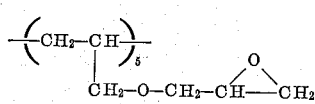

together with 17 grams of the sequestering agent

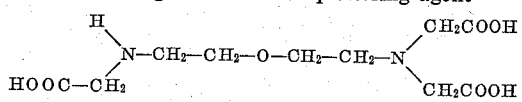

The resultant sequestering resin has the following repeating units:

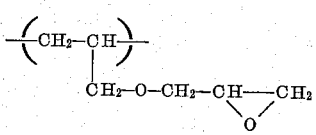

and

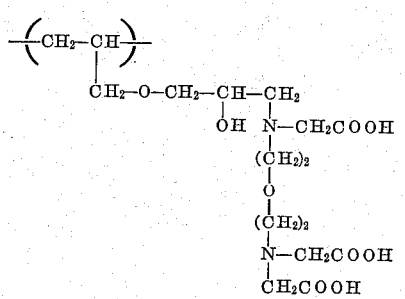

The sequestering resin is further insolubilized by the addition of 3.5 grams of tetraethylene pentamine and the resultant crosslinked ion exchange chelating resin has the following repeating units:

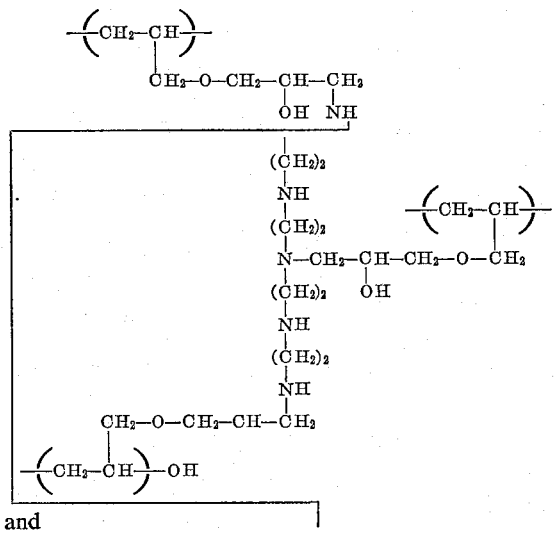

and an epoxide equivalent of 177 g./epoxy together with 26.9 grams of the sequestering agent.

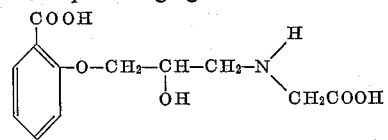

The resultant sequestering resin has repeating units including

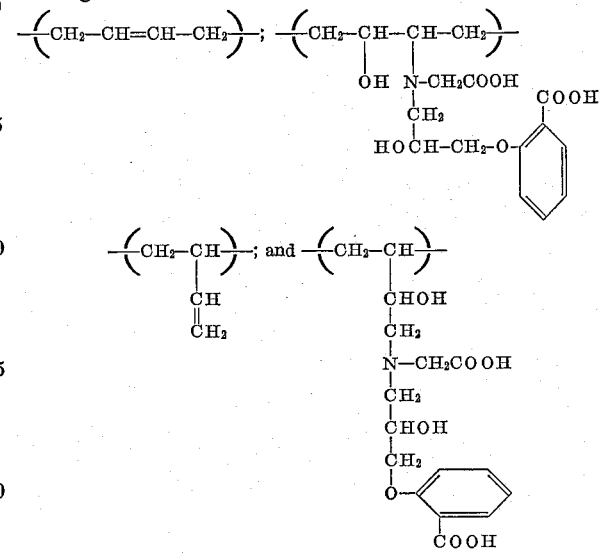

The sequestering polymer is crosslinked by heating with benzoyl peroxide.

Example 5

The procedure of Example 2 is followed utilizing 17.7 grams of epoxidized polybutadiene (Oxiron 2000) having

Example 6

The procedure of Example 2 is followed utilizing 19.7 grams of a bisphenol epoxy (Shell 828) of the average formula

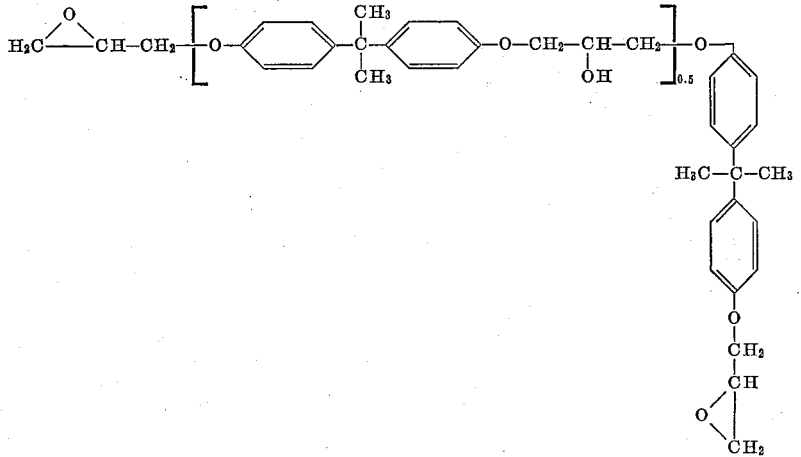

together with 30 grams of the sequestering agent

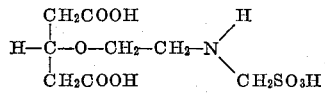

The resulting sequestering resin has the formula

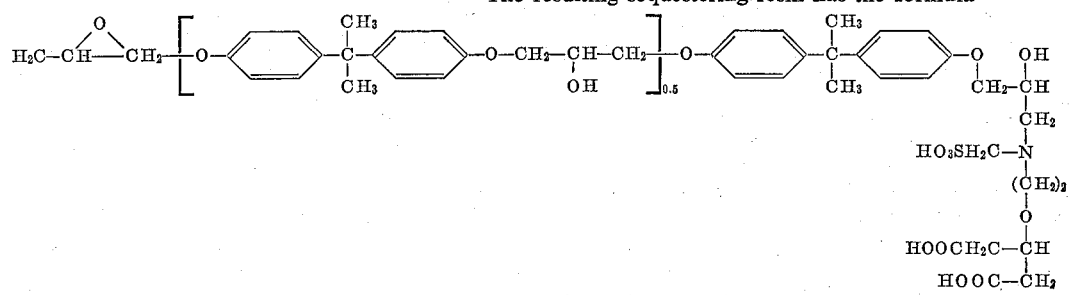

The resin is then crosslinked with polyethylinimine.

Example 7

The procedure of Example 2 is followed utilizing 55 g. of bisphenol epoxy (Dow D.E.R. 661) of the average formula

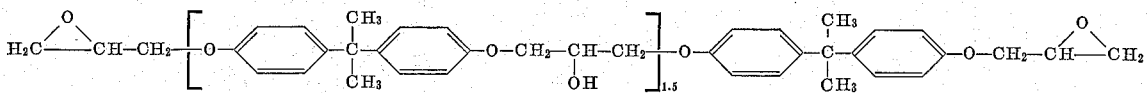

together with 43 grams of the sequestering agent

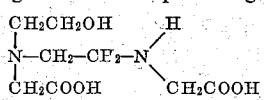

to form an ion exchange chelating resin. The resin may be crosslinked with glyoxal.

Example 8

The procedure of Example 2 is followed utilizing 23.5 grams of a Novolac based epoxy (Kopox 997A) formed by the reaction of epichlorohydrin and a low molecular weight ortho-cresol-formaldehyde polymer of the average formula

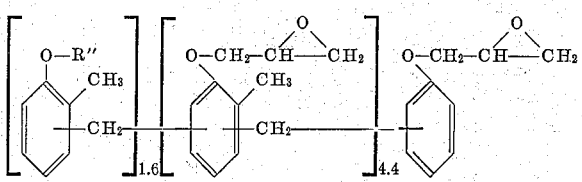

where R″ is a chlorohydrin, a glycol or a polymeric ether. This epoxy is reacted with an excess of sequestering agent having the formula

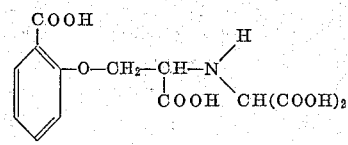

The resultant sequestering resin is then crosslinked with toluene diisocyanate to form the insoluble resin.

Example 9

The procedure of Example 9 is followed utilizing 17.5 grams of an epoxidized natural oil ("Epoxol 9–5") having the formula

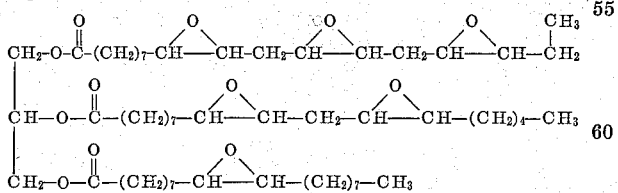

together with 17 grams of the sequestering agent

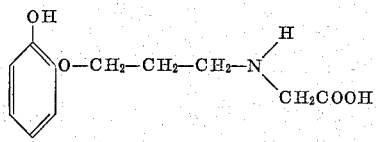

The resulting sequestering resin is then crosslinked with polyethylenimine.

Example 10

To 500 cc. of acetone, 20 grams of epoxidized vinyl cyclohexene

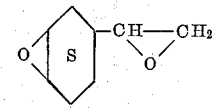

are added. An equimolar proportion of polyethylinimine is added and the mixture is copolymerized and crosslinked to form among others the following repeating units

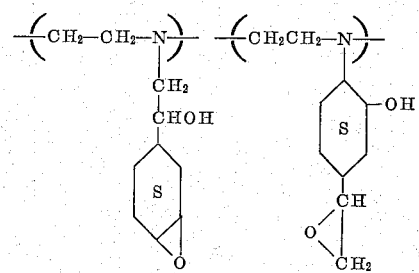

The polymer is then reacted with an equimolar portion of the sequestering agent of the formula

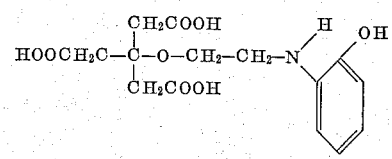

to form an ion exchange chelating resin containing the following units:

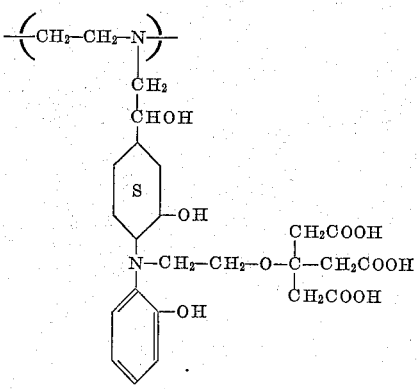

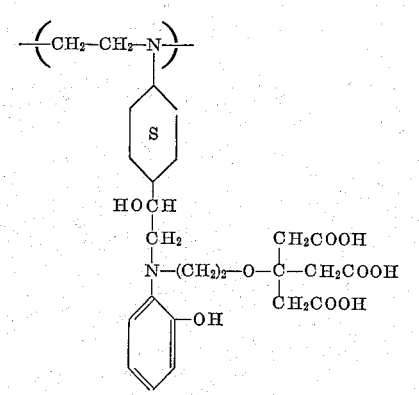

Example 11

The procedure of Example 2 is followed utilizing 20 grams of a mixture of limonene dioxide

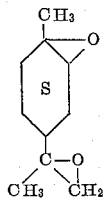

and epoxidized divinyl benzene

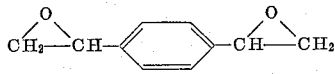

in equimolar proportions. To the epoxide materials are added 16 grams of the sequestering agent

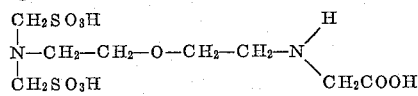

The materials are reacted and then crosslinked with polyethylenimine.

Example 12

The procedure of Example 2 is followed utilizing 1 mol of 3,4-epoxy-6-methyl-cyclohexyl methyl 3,4-epoxy-6-methyl cyclohexane carboxylate ("Unox Epoxide 201")

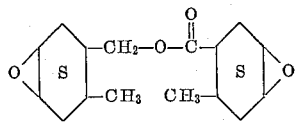

together with ½ mol each of the following two sequestering agents

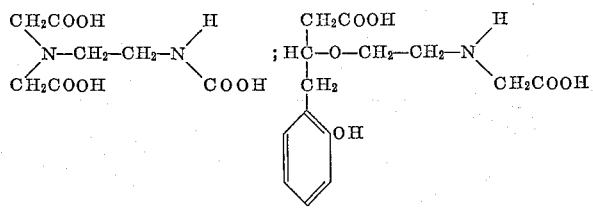

The materials are reacted and the sequestering epoxide is then crosslinked with polyethylenimine and 0.1 mol Epoxide 201.

Example 13

The procedure of Example 2 is followed utilizing 1 mol of dicyclopentadiene dioxide ("Unox Epoxide 207")

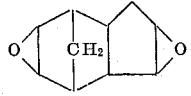

together with 1 mol of the sequestering agent

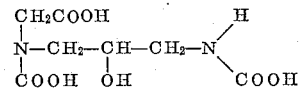

The resultant sequestering epoxide is then crosslinked with tetraethylene pentamine.

Example 14

The procedure of Example 2 is followed utilizing 1 mol of polymerized vinyl cyclohexene monoxide (1,2-epoxy-4-vinylcyclohexane) based on the monomer

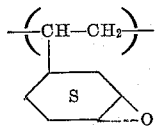

together with 1 mole of the sequestering agent

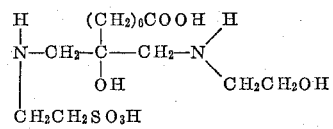

to provide an ion exchange chelating resin.

Example 15

The procedure of Example 2 is followed utilizing 1 mol of the polymer of 1-vinyl phenoxy 2,3-epoxypropane

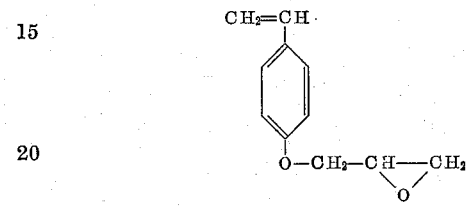

based on the monomer, together with ½ mol of the sequestering agent

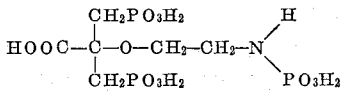

to provide an ion exchange chelating resin. Such resin is then crosslinked with polyethylenimine.

Example 16

The procedure of Example 2 is followed utilizing 1 mol of polyglycidyl methacrylate, based on the monomer, and 1 mol of the sequestering agent

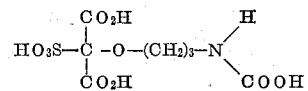

to form an ion exchange chelating resin. This resin is then crosslinked utilizing polyethylenimine.

Example 17

The procedure of Example 2 is followed utilizing epoxidized butadiene together with amino diacetic acid.

Example 18

The procedure of Example 2 is followed utilizing 1 mol of epoxidized bisphenol A (Shell "834" epoxy) together with 2 mols of amino diacetic acid. The resultant sequestering epoxide is then crosslinked with glutaraldehyde.

Example 19

One mole of the compound

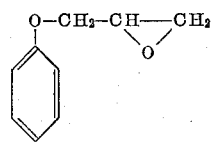

is reacted with 1 mol of the sequestering agent

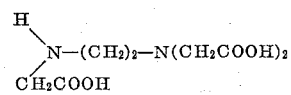

to yield to the monomeric sequestering material

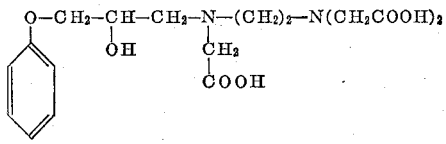

which in turn is reacted with 1 mol of formaldehyde to yield an ion exchange chelating resin having the following repeating unit $$\left[\begin{array}{c} O-CH_2-CH-CH_2-N-(CH_2)_2-N\begin{array}{c}CH_2COOH\\ \\CH_2COOH\end{array}\\ OH\qquad CH_2COOH\\ \\ \text{—}CH_2\text{—}\\ \end{array}\right]$$

Example 20

The ion exchange chelating resin of Example 19 *is* further reacted with more formaldehyde under acidic conditions and yields an insoluble, crosslinked resin.

Example 21

The sequestering agent diethylene triamine tetracetic acid is reacted with epichlorohydrin to form the epoxidized sequestering agent $$\begin{array}{c}CH_2COOH\qquad CH_2-CH\overset{O}{\diagup\!\diagdown}CH_2\\ N-CH_2-CH_2-N\\ CH_2COOH\qquad CH_2CH_2N(CH_2COOH)_2\end{array}$$

The epoxidized sequestering agent (32.7 grams) is then reacted with 10 grams of polyethylenimine to form ion chelating resin having the repeating units $$-\!\!\left(CH_2-CH_2-N\right)\!\!- \text{ and } -\!\!\left(CH_2-CH_2-N\right)\!\!-$$
$$\qquad\qquad\qquad\qquad\qquad\qquad CH_2$$
$$[(HOOC-CH_2)_2N-CH_2-CH_2]_2-N-CH_2-CHOH$$

Example 22

The ion exchange chelating resin of Example 21 is crosslinked with 3 grams of epichlorohydrin to yield a resin having the repeating units $$-\!\!\left(CH_2-CH_2-N\right)\!\!-\ ;\ -\!\!\left(CH_2-CH_2-N\right)\!\!-\ ;\ \text{and}\ -\!\!\left(CH_2-CH_2-N\right)\!\!-$$
$$\qquad\qquad H\qquad\qquad\qquad CH_2\qquad\qquad\qquad CH_2$$
$$\qquad\qquad\qquad\qquad\qquad\qquad CHOH\qquad\qquad\qquad CHOH$$
$$\qquad\qquad\qquad\qquad\qquad\qquad CH_2\qquad\qquad\qquad CH_2$$
$$[(HOOC-CH_2)_2N-CH_2-CH_2]_2-N\qquad -\!\!\left(CH_2-CH_2-N\right)\!\!-$$

Example 23

The epoxidized sequestering agent $$\begin{array}{c}CH_2COOH\qquad CH_2-CH\overset{O}{\diagup\!\diagdown}CH_2\\ HOOC-C-O-CH_2-CH_2-N\\ CH_2COOH\qquad CH_2COOH\end{array}$$

formed by the reaction of 9.3 grams of epichlorhydrin and 29 grams of $$\begin{array}{c}CH_2COOH\qquad H\\ HOOC-C-O-CH_2-CH_2-N\\ CH_2COOH\qquad CH_2COOH\end{array}$$

is reacted with 9.3 grams of the monomer $$\langle\!\!\!\!\bigcirc\!\!\!\!\rangle\!-NH_2$$

and the resulatant sequestering monomer is reacted with 4 grams of glyoxal to form the ion exchange chelating resin $$\left[\begin{array}{c}\ \\ \langle\bigcirc\rangle\text{—}CH\text{—}\\ \qquad\qquad HC=O\\ NH\\ CH_2\\ CHOH\\ HOOC-CH_2\qquad CH_2\\ HOOC-C-O-(CH_2)_2-N-CH_2COOH\\ HOOC-CH_2\end{array}\right]$$

It will be obvious to those skilled in the are that various changes may be made without departing from the spirit of the invention and therefore the invention is not limited to what is described in the specification, but only as indicated in the appended claims.

What is claimed is:

1. A chelating resin comprising the reaction product of:
   (A) a polymer containing a plurality of epoxy groupings selected from the group consisting of 4,4'-isopropylidenediphenol based epoxides, epoxidized polybutadiene, epoxidized vinyl cyclohexene, epoxidized divinyl benzene, phenol-formaldehyde based epoxides, epoxidized resorcinol-formaldehyde, 1-vinyl phenoxy-2,3-epoxy propane polymers, glycidyl methacrylate polymers, epoxidized natural oil having the formula $$\begin{array}{l}CH_2-O-CO-(CH_2)_7-CH\overset{O}{\diagup\!\diagdown}CH-CH_2-CH\overset{O}{\diagup\!\diagdown}CH-CH_2-CH\overset{O}{\diagup\!\diagdown}CH-CH_2-CH_3\\ CH-O-CO-(CH_2)_7-CH\overset{O}{\diagup\!\diagdown}CH-CH_2-CH\overset{O}{\diagup\!\diagdown}CH-(CH_2)_4-CH_3\\ CH_2-O-CO-(CH_2)_7-CH\overset{O}{\diagup\!\diagdown}CH-(CH_2)_7-CH_3\end{array}$$

limonene dioxide, 3,4-epoxy-6-methyl-cyclohexyl methyl 3,4-epoxy-6-methyl cyclohexane carboxylate, dicyclopentadiene dioxide, and 1,2-epoxy-4-vinyl cyclohexane; and (B) a sequestering agent having the general formula:

$$M-(CYX)_a-N\begin{array}{c}H\\ \diagdown\\ G\end{array}$$

wherein —G is selected from the group consisting of
—H, —(CH$_2$)$_p$COOH, —CH(COOH)$_2$
—CH$_2$CH$_2$OH, —CH$_2$CH$_2$—O—CH$_2$CH$_2$OH, $$\begin{array}{ccc}OH & OH & OH\\ \langle\bigcirc\rangle\text{—}CH_2\text{—}\langle\bigcirc\rangle & \text{—}CH\text{—}\langle\bigcirc\rangle\\ & & COOH\end{array}$$

—(CH$_2$)$_p$SO$_3$H, —(CH$_2$)$_p$PO$_3$H$_2$, and not to exceed one unit per sequestering agent molecule of $$-CH_2CH_2N\begin{array}{c}E\\ \diagdown\\ F\end{array}$$

wherein *p* is an integer of from 0–2 inclusive; wherein —X is selected from the group consisting of —H and —(CH$_2$)$_6$COOH; wherein —Y is selected from the group consisting of —H, —COOH, and —OH;

wherein $a$ is an integer of from 1 to 3 inclusive;
wherein —M is selected from the group consisting of

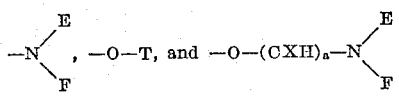

wherein —T is selected from the group consisting of

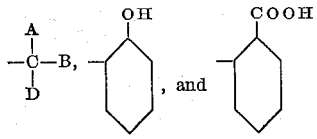

wherein —A, —B, and —D are selected from the group consisting of

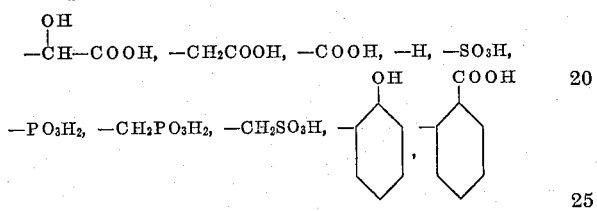

and not to exceed one unit per sequestering agent molecule of —(CHY)$_a$—O—T; and wherein —E and —F are the same as —G; said sequestering agent being linked through at least one of said epoxy groupings at an amine position of said agent to form said ion exchange chelating resin.

2. A chelating resin comprising the reaction product of:
(A) an organic epoxy containing resin having the general formula:

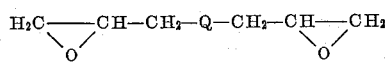

wherein Q is selected from the group consisting of

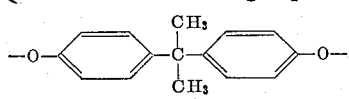

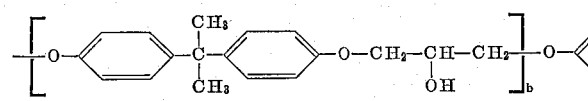

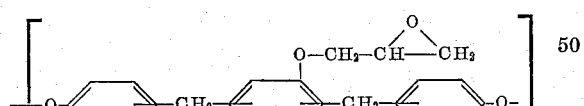

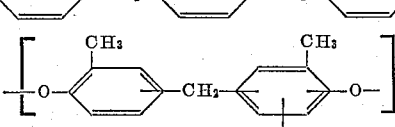

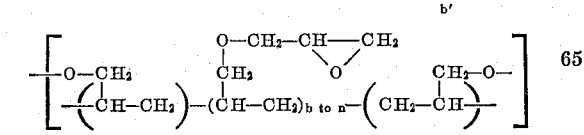

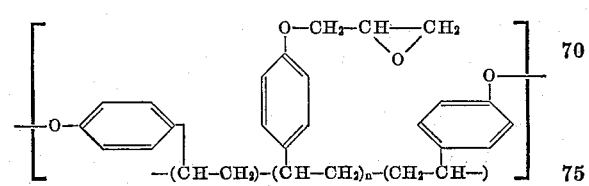

and

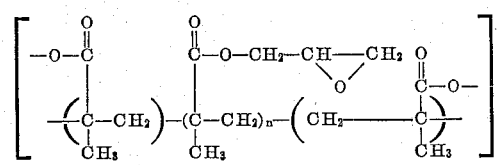

wherein R'' is selected from the group consisting of chlorohydrins, glycols and polymeric ethers, $b$ represents an average number between 0 and 5.5, $b'$ represents an average number of about 1.6, and $n$ is an integer; and (B) a sequestering agent having the general formula:

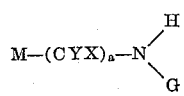

wherein —G is selected from the group consisting of —H, —(CH$_2$)$_p$COOH, —CH(COOH)$_2$

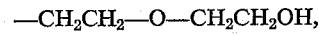

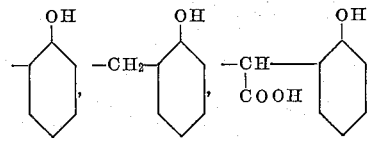

—(CH$_2$)$_p$SO$_3$H, —(CH$_2$)$_p$PO$_3$H$_2$, and not to exceed one unit per sequestering agent molecule of

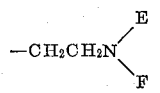

wherein $p$ is an integer of from 0–2 inclusive; wherein —X is selected from the group consisting of —H and —(CH$_2$)$_6$COOH; wherein —Y is selected from the group consisting of —H, —COOH, and —OH; wherein $a$ is an integer of from 1 to 3 inclusive; wherein —M is selected from the group consisting of

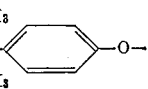

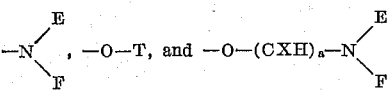

wherein —T is selected from the group consisting of

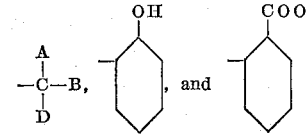

wherein —A, —B, and —D are selected from the group consisting of

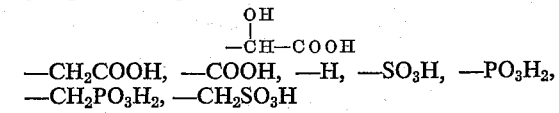

—CH$_2$COOH, —COOH, —H, —SO$_3$H, —PO$_3$H$_2$, —CH$_2$PO$_3$H$_2$, —CH$_2$SO$_3$H

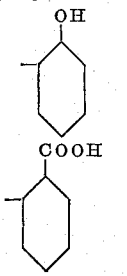

and not to exceed one unit per sequestering agent molecule of —(CHY)$_a$—O—T; and wherein —E and —F are the same as —G; said sequestering agent being linked to said epoxy compound through from 10 to 100% of said epoxy groupings at the NH portion of said agent to form said ion exchange chelating resin.

3. A chelating resin comprising the reaction product of:
(A) epoxidized polybutadiene; and
(B) a sequestering agent having the general formula

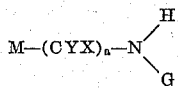

wherein —G is selected from the group consisting of —H, —(CH$_2$)$_p$COOH, —CH(COOH)$_2$

—CH$_2$CH$_2$OH

—CH$_2$CH$_2$—O—CH$_2$CH$_2$OH,

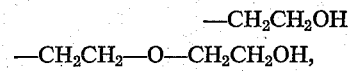

—(CH$_2$)$_p$SO$_3$H, —(CH$_2$)$_p$PO$_3$H$_2$, and not to exceed one unit per sequestering agent molecule of

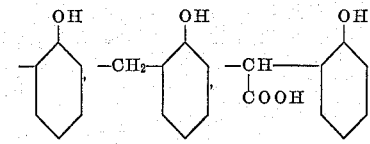

wherein $p$ is an integer of from 0–2 inclusive; wherein —X is selected from the group consisting of —H and —(CH$_2$)$_6$COOH; wherein —Y is selected from the group consisting of —H, —COOH, and —OH; wherein $a$ is an integer of from 1 to 3 inclusive; wherein —M is selected from the group consisting of

wherein —T is selected from the group consisting of

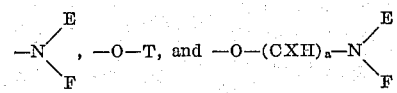

wherein —A, —B, and —D are selected from the group consisting of

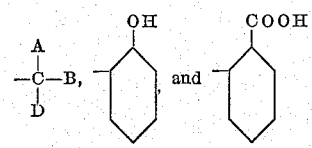

—CH$_2$COOH, —COOH, —H, —SO$_3$H, —PO$_3$H$_2$, —CH$_2$PO$_1$H$_2$, —CH$_2$SO$_3$H,

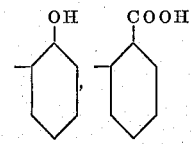

and not to exceed one unit per sequestering agent molecule of —(CHY)$_a$—O—T; and wherein —E and —F are the same as —G; said sequestering agent being linked to said epoxidized polybutadiene through from 10 to 100% of said epoxy groupings at the NH portion of said agent to form said ion exchange chelating resin.

4. A chelating resin having a plurality of repeating units of the formula:

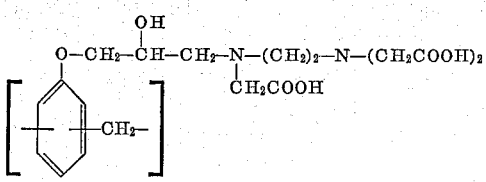

5. A chelating resin comprising the reaction product of:
(A) a nitrogen containing compound selected from the group consisting of polyamines and polyimines containing a multiplicity of reactive NH groupings and polymerizable amine and imine monomers containing at least one reactive NH grouping which monomers are subsequently polymerized; and
(B) a sequestering agent having the general formula:

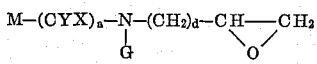

wherein —G is selected from the group consisting of —H, —(CH$_2$)$_p$COOH, —CH(COOH)$_2$,

—CH$_2$CH$_2$OH

—CH$_2$CH$_2$—O—CH$_2$CH$_2$OH,

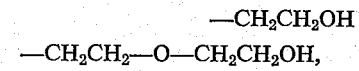

—(CH$_2$)$_p$SO$_3$H, —(CH$_2$)$_p$PO$_3$H$_2$, and not to exceed one unit per sequestering agent molecule of

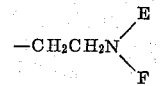

wherein $p$ is an integer of from 0–2 inclusive; wherein —X is selected from the group consisting of —H and —(CH$_2$)$_6$COOH; wherein —Y is selected from the group consisting of —H, —COOH, and —OH; wherein $a$ is an integer of from 1 to 3 inclusive; wherein —M is selected from the group consisting of

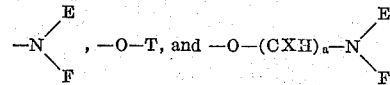

wherein —T is selected from the group consisting of

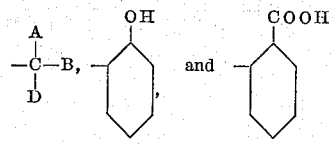

wherein —A, —B, and —D are selected from the group consisting of

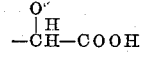

—CH$_2$COOH, —COOH, —H, —SO$_3$H, —PO$_3$H$_2$

—CH$_2$PO$_3$H$_2$, —CH$_2$SO$_3$H,

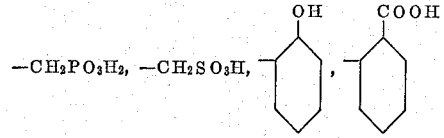

and not to exceed one unit per sequestering agent molecule of —(CHY)$_a$—O—T; and wherein —E and —F are the same as —G and $d$ is an integer of from 1 to 4; said agent being linked in said chelating resin at an amine position to the polymer chain as a side-group, said side-group sequestering agent not linking two segments of the polymer chain.

6. A chelating resin comprising the reaction product of:
(A) a polymer having at least one linear portion and containing a plurality of epoxy groupings; and
(B) a sequestering agent having the general formula:

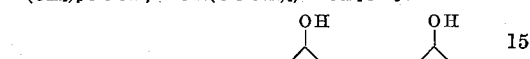

wherein —G is selected from the group consisting of
—H, —(CH$_2$)$_p$COOH, —CH(COOH)$_2$, —CH$_2$CH$_2$OH

—CH$_2$CH$_2$—O—CH$_2$CH$_2$OH,

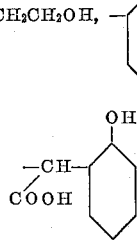

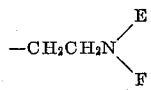

—(CH$_2$)$_p$SO$_3$H, —(CH$_2$)$_p$PO$_3$H$_2$, and not to exceed one unit per sequestering agent molecule of

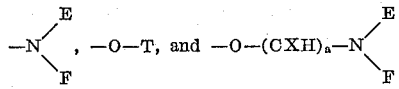

wherein $p$ is an integer of from 0–2 inclusive; wherein —X is selected from the group consisting of —H and —(CH$_2$)$_6$COOH; wherein —Y is selected from the group consisting of —H, —COOH, and —OH; wherein $a$ is an integer of from 1 to 3 inclusive; wherein —M is selected from the group consisting of

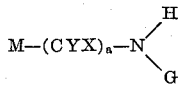, —O—T, and —O—(CXH)$_a$—N<E/F wherein —T is selected from the group consisting of

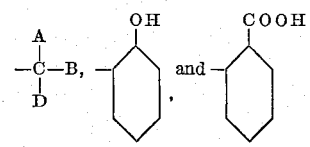

wherein —A, —B, and —D are selected from the group consisting of

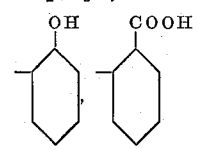

—CH$_2$COOH, —COOH, —H, —SO$_3$H, —PO$_3$H$_2$,
—CH$_2$PO$_3$H$_2$, —CH$_2$SO$_3$H,

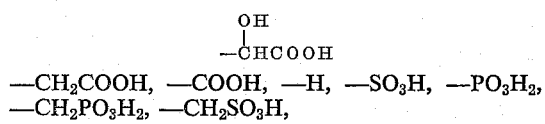

and not to exceed one unit per sequestering agent molecule of —(CHY)$_a$—O—T; and wherein —E and —F are the same as —G; said sequestering agent being linked through said epoxy grouping at an amine position of said agent to provide said chelating resin with a plurality of units of the formula

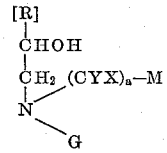

being pendant as a side grouping thereto.

References Cited by the Examiner
UNITED STATES PATENTS

| | | | |
|---|---|---|---|
| 2,765,284 | 10/1956 | Bersworth | 260—2 |
| 2,829,135 | 4/1958 | Greenspan et al. | 260—2 |
| 3,228,920 | 1/1966 | D'Alelio | 260—2.1 |

WILLIAM H. SHORT, *Primary Examiner.*
C. A. WENDEL, *Assistant Examiner.*